Figure 1:
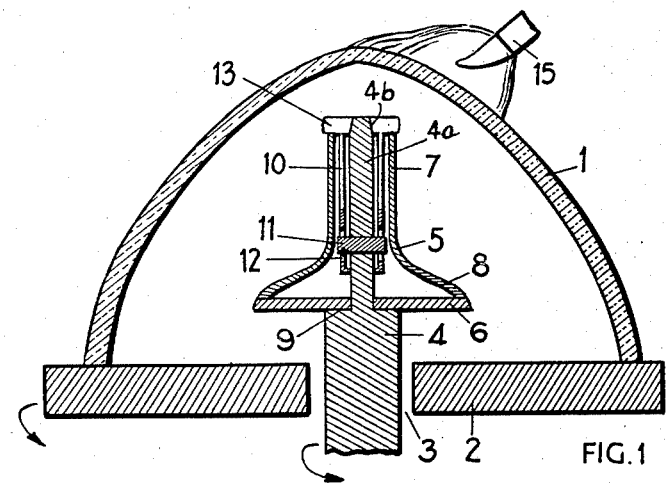

May 19, 1959  R. L. BREADNER ET AL  2,886,920
METHOD OF AND APPARATUS FOR MANUFACTURE OF THE
GLASS ENVELOPE FOR A CATHODE RAY TUBE
Filed April 7, 1954  3 Sheets-Sheet 1

INVENTORS
ROBERT LEONARD BREADNER
CHARLES HENRY SIMMS
BY
ATTORNEY

INVENTORS
ROBERT LEONARD BREADNER
CHARLES HENRY SIMMS

BY
ATTORNEY

May 19, 1959 R. L. BREADNER ET AL 2,886,920
METHOD OF AND APPARATUS FOR MANUFACTURE OF THE
GLASS ENVELOPE FOR A CATHODE RAY TUBE
Filed April 7, 1954 3 Sheets-Sheet 3

INVENTORS
ROBERT LEONARD BREADNER
CHARLES HENRY SIMMS
BY
ATTORNEY

United States Patent Office 2,886,920
Patented May 19, 1959

2,886,920

METHOD OF AND APPARATUS FOR MANUFACTURE OF THE GLASS ENVELOPE FOR A CATHODE RAY TUBE

Robert Leonard Breadner, Kenton, and Charles Henry Simms, Twickenham, England, assignors to The General Electric Company Limited, London, England Application April 7, 1954, Serial No. 431,898

Claims priority, application Great Britain April 13, 1953

3 Claims. (Cl. 49—7)

This invention relates to the manufacture of glass bodies comprising a relatively thick main wall portion and a relatively thin-walled neck portion extending from an aperture in the main wall portion, and wherein the shapes of the glass surfaces at the adjoining parts of the neck and main wall portion are required to be carefully controlled.

More particularly, though not exclusively, the invention relates to the manufacture of glass envelopes of the kind consisting of a body section which is in the approximate shape of a hollow truncated cone (and which will hereinafter be referred to as the conical section or cone), an end section closing the wider end of the conical section, and a tubular neck section continuing and closing the narrower end of the conical section. Such envelopes are required, for example, for cathode ray tubes of the kind used for television reception, and the invention is especially concerned with the manufacture of such envelopes for cathode ray tubes.

The conical section is usually formed by pressing in mould, and so also is the end section, which is usually in the shape of a dished plate or bowl, though the construction of the end section is not relevant to the present invention; the conical section has not hitherto been formed integrally with the tubular neck section during the pressing operation owing to practical difficulties; usually the conical section has been pressed with a closed narrower end which is subsequently cut off at a diameter greater than that of the tubular neck section, the latter being provided by a flared glass tube whose flared end is sealed to, so as to continue, the narrower end of the truncated conical section. In some cases a short intervening glass tube having a flared end has been sealed to the narrower end of the conical section and a simple cylindrical tube, which constitutes the tubular neck, has been sealed to the opposite end of this intervening tube.

In the envelope of a cathode ray tube, it is usually desirable for the wall thickness of the tubular neck to be as small as practicable, for example in order to enhance the effect on the electron beam of magnetic deflection coils arranged outside the neck; on the other hand the wall thickness of the conical section is necessarily relatively great owing to the fact that it is made by pressing, so that the flared end of the neck, or of the intervening tube where employed, has had to be of graded thickness to enable satisfactory sealing to be accomplished. A further complication which adds to the difficulties of manufacture is the fact that both the internal and external shapes at the junction of the flared portion and the tubular neck have to be accurately determined, for example for co-operation with the magnetic deflection coils to avoid cut-off of the electron beam at the extremes of its scan in operation of the cathode ray tube of which the envelope forms part, which has necessitated accurate shaping of the flared neck tubes in the known methods of construction. These known methods of construction have thus presented considerable difficulties and the main object of this invention is to provide a method of manufacturing the conical section and tubular neck section for a glass envelope of the kind referred to in which those difficulties are reduced.

The method in accordance with the invention is, however, of more general application, as will be appreciated from the following further description.

According to the invention, a method of manufacturing a glass body comprising a relatively thick main wall portion and a relatively thin-walled neck portion extending from an aperture in the main wall portion, and wherein the shapes of the glass surfaces at the adjoining parts of the neck and main wall portion are required to be carefully controlled, includes the steps of forming the main wall portion continuous where said aperture is to be formed, heating the main wall portion in the region where said aperture is to be formed so as to soften the glass, pushing the softened glass away from the main wall portion by means of a forming tool so as to draw out the softened glass into the form of a neck, and shaping the surfaces of the adjoining parts of the main wall portion and neck by applying a shaped body against one side of the glass so as to press the softened glass against a co-operating shaped surface of the forming tool on the other side of the glass.

The forming tool preferably has a substantially cylindrical surface at the end which enters into the neck as and when formed, and this cylindrical surface flares outwards at the other end of the tool so that the outer surfaces of this flared portion and the adjoining part of the cylindrical portion provide the said shaped surface of the forming tool.

The nature of the shaped body suitable in any particular case will depend on the nature and shapes of the neck and main wall portion, but where, as will usually be the case, the adjoining parts of the neck and main wall portion have the shape of a surface of revolution, the shaped body may conveniently be a shaped roller arranged to press the glass against the shaped surface of the forming tool, the latter surface then also being in the form of a surface of revolution, and to shape the whole circumferential zone of said adjoining parts by virtue of relative rotation produced between the axis of the roller on the one hand, and the neck and main wall portion on the other hand. In other cases the shaped body may be of a different nature, for example a split mould arranged to close round the adjoining parts of the neck and main wall portion.

Where it is possible to rotate the glass body during the heating and neck forming process, this will be desirable for ensuring uniformity of heating of the glass and facilitating its shaping, but this may not always be possible; care should then be taken to ensure uniformity of heating of the glass, for example by the use of rotating burners.

In applying the method in accordance with the invention to the manufacture of the conical section and tubular neck section of a glass envelope of the kind referred to, the conical section is formed with a closed narrower end, the said closed end is heated to soften the glass, the softened glass is pushed outwards by means of a forming tool located within the hollow interior of the conical section so as to produce a tubular extension which has a wall thickness which is less than that of the conical section, and the interior and exterior surfaces of the adjoining parts of the tubular extension and conical section are shaped by means of a shaped body located outside the conical section and arranged to press the softened glass into contact with a shaped surface of the forming tool.

For the manufacture of a conical section and tubular neck section for the glass envelope of a cathode ray tube of the kind used for television reception, the neck section will usually be formed coaxial with the conical section by pushing the softened glass outwards in the direction of the axis of the conical section.

The tubular extension, hereinafter referred to for short as the stub, may in some cases be of such length as by itself to provide the whole of the required neck section, but in most cases it will be preferable to form a relatively short stub, cut away the closed end of the stub, and seal a glass tube to, as a continuation of, the stub at its open end so as to complete the required neck section.

In carrying out the method in accordance with the invention, the forming tool should be constructed so that it can readily be withdrawn from the formed neck and this may be effected in various ways; thus the forming tool may be given a slight taper towards the end which first abuts against the glass, and/or the forming tool may be constructed as a hollow shell the sides of which are slotted to render them resilient, and/or the end part of the tool which presses outwards the glass of the main wall portion may be constructed so that its diameter can be decreased for facilitating withdrawal of the tool from the formed neck, or in some cases the tool may be constructed in the form of a roller whose axis is offset from the axis of the neck so that the latter is formed with a greater diameter than the part of the tool which enters into the neck.

These and other features of the invention will be further explained in the following description of the application of the method of the invention to the manufacture of the conical section and stub for a glass envelope of the kind referred to. The possibility of more general application of the features will readily be appreciated.

In this manufacture, for forming the stub the forming tool is arranged with the end of the cylindrical portion of the tool presented towards the closed narrower end of the conical section, the forming tool being moved axially to push out the heat-softened glass at said closed end so as to form the stub, and the axial movement of the forming tool being arrested when the flared portion of the tool just abuts against the interior surface surrounding the stub at the narrower end of the conical section, the said shaped body being then brought down on to the softened glass over the shaped surface of the forming tool for shaping simultaneously the interior and exterior surfaces of the glass wall of the stub and the adjacent part of the conical section.

In the region of said shaped surface, the part of the forming tool which is arranged to come into contact with the heated glass is preferably formed as a thin metal shell having a small heat capacity in order to reduce the possibility of cracks being formed in the glass by chilling when first brought into contact with the shaped surface.

In such an arrangement the head of the forming tool, that is to say the part which pushes out the heat softened glass at the narrower end of the glass conical section to form the stub, is preferably prevented from becoming overheated during this process by forming it with a relatively large heat capacity, for example by forming it with a wall thickness which is greater than that in the region of the shaped surface, and/or by forming it of a material whose specific heat and thermal conductivity are greater than the part which provides said shaped surface.

Figure 5:
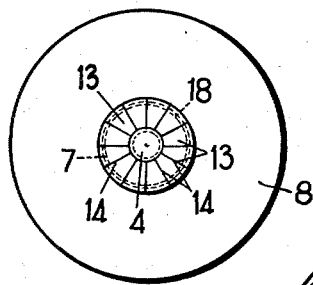
Figure 4:
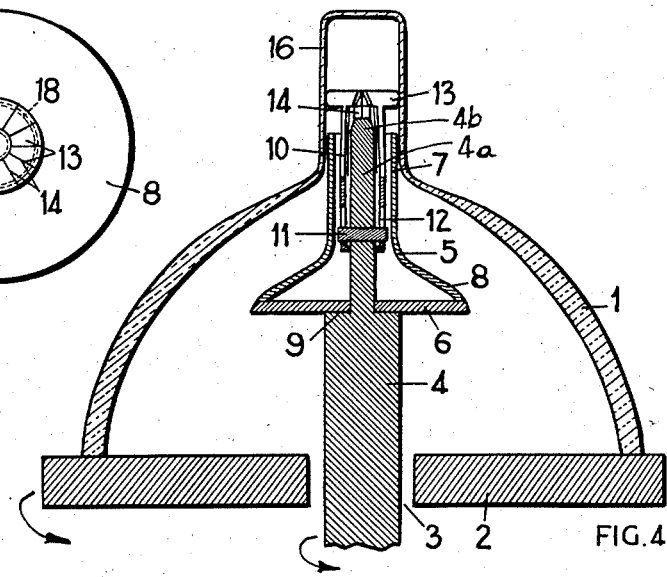

Two different examples of the application of the method in accordance with the invention to the manufacture of the conical section and stub for the envelope of a cathode ray tube will now be described by way of example with reference to the accompanying drawings, in which Figures 1 to 4 represent part-sections through the axis of apparatus using one construction of forming tool, the different figures representing different stages in the manufacture, Figure 5 represents a plan view of a part of the apparatus shown in Figures 1 to 4, and Figures 6 to 8 represent part-sections through the axis of apparatus using a different construction of forming tool, the different figures again representing different stages in the manufacture.

Referring now to Figure 1, the pressed glass cone 1, which constitutes the said conical section of a cathode ray tube envelope, is arranged to be carried on the top surface of a flat circular horizontal face plate 2 with its closed narrower end uppermost, and the face plate 2 is arranged to rotate about a vertical axis, the cone 1 being secured coaxially to the face plate by any suitable means (not shown) so as to rotate with the face plate about their common axis.

Located at the centre of the face plate 2 is a circular hole 3 through which extends, coaxially with the axis of rotation, a rotatable shaft 4 which carries the forming tool 5, the shaft comprising a lower section about one inch in diameter and an upper section, coaxial with the lower section and formed integrally with it, about $9/_{16}$ inch in diameter.

The forming tool 5 comprises an outer cylindrical portion 7 substantially in the form of a hollow steel cylinder approximately $3\tfrac{3}{32}$ inches in external diameter, and 3 inches in length, open at one end and flared outwards at the other end to a diameter of about 3½ inches, the cylindrical portion 7 having a taper of about 1° towards said open end. The wider end of the flare 8 is closed by a flat circular metal base plate 6 having a circular hole located at the centre, and the cylindrical portion is mounted vertically on the shaft 4 with the flared end downwards and with the narrower upper section of the shaft passing through the hole in the base plate, the base plate being welded to the annular shoulder 9, formed at the top end of the lower section of the shaft, so as to support the forming tool coaxially with the shaft 4. The length of the narrower top section 4a of the shaft 4 is such that it projects axially for about ⅛ inch beyond the open end of the cylindrical portion 7 of the forming tool, the projecting part of the shaft tapering as at 46 to a diameter of $7/_{16}$ inch at the top end. The outer surface of the flare 8 and the adjacent part of the cylindrical portion 7 provide the shaped surface against which the softened glass is pressed by the external shaped body, and the wall thickness in this region is about $1/_{16}$ inch, thus ensuring only a small heat capacity for reducing the possibility of cracks being formed in the heated glass as it is first pressed into contact with the shaped surface during the formation of the stub.

Between the upper section of the shaft 4 and the outer cylindrical portion 7 there is located a cylindrical metal sleeve 10, formed for example of stainless steel and arranged to be able to slide axially within the annular gap formed within the outer cylinder and the shaft, the lower end of the sleeve being closed apart from a hole through which the shaft extends. Rotation of the sleeve 10 relatively to the shaft, and hence to the outer cylinder 7, is prevented by means of a transverse spigot 11 which is fixed in a hole extending radially through the upper section of the shaft 4, the two ends of the spigot extending into, and being free to slide along, two axially, directed slots 12 in the wall of the sleeve, the slots also limiting the degree of axial movement of the sleeve 10 relatively to the shaft.

The upper end of the sleeve 10 is terminated by a thickened end wall 13 approximately in the form of a circular disc about $1\tfrac{7}{16}$ inches in diameter and which extends radially beyond the outer curved surface of the cylindrical part of the sleeve, the end wall being provided with a circular hole at the centre which tapers towards the top surface in a similar manner to the end of the shaft 4 and into which hole the end of the shaft is arranged to fit when the sleeve is in its lowermost position relatively to the shaft and to the outer cylinder 7. The lower limit of movement of the sleeve relatively to the outer cylinder 7 and the shaft 4 is provided by the outwardly extending part of the end wall 13 abutting against the upper end of the outer cylindrical portion 7, and the upper limit of movement of the sleeve is provided by the spigot 11 abutting against the bottom edges of the slots 12 in the sleeve within which it is arranged to slide.

The thickened end wall, and the top part of the cylindrical section of the sleeve 10 are divided into twelve equal segments by twelve slots 14 (see Figures 4 and 5), which extend for about 1¾ inches from the top end of the sleeve and are 0.02 inch in width, so that this end of the sleeve can be expanded or contracted. Thus, when the tapered end of the shaft 4 is inserted into the tapered hole at the center of the segmented end wall 13 of the sleeve 10, the end wall is locked in the expanded condition, but when the tapered end of the shaft 4 is withdrawn from the tapered hole the diameter of the end wall may be decreased, by a radially inward pressure on the outer surfaces of the segments, by about ⅟₁₆ inch, the diameter of the wall in the fully contracted condition being about ⅟₃₂ less than the external diameter at the top end of the outer cylindrical portion 7.

Figure 2:
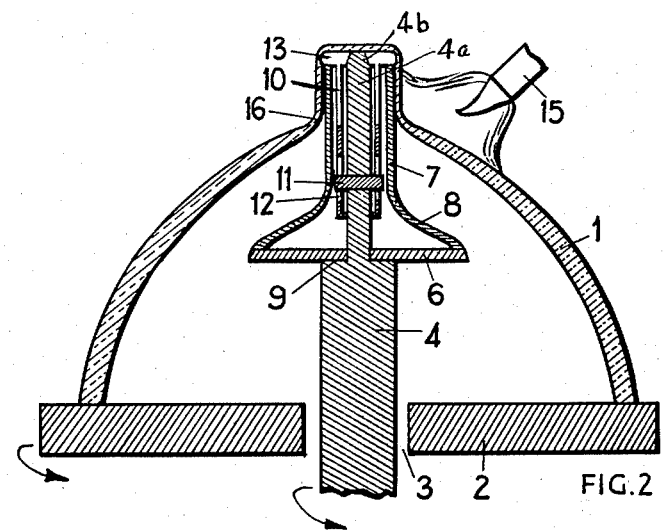
Figure 3:
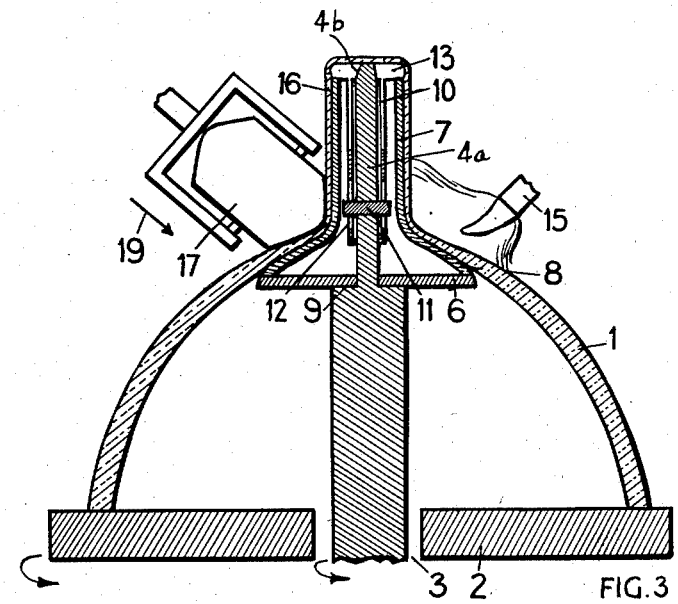

The slots 14 have been omitted from Figures 1 to 3 for simplicity.

The end wall 13 of the sleeve 10 is arranged to push out the heat softened glass at the narrower end of the glass cone 1 for forming the stub, and is thicker than the rest of the sleeve so that it does not become heated to too high a temperature whilst performing this operation.

The shaft 4 is arranged to be moved axially with respect to the face plate 2 for raising and lowering the forming tool 5, and is arranged to rotate in operation of the apparatus at the same speed as the face plate.

A plurality of gas burners 15, only one of which is shown in the figure for simplicity, are situated above the face plate 2 for softening the glass at the narrower end of the glass cone 1.

In forming the stub after the cone 1 has been secured to the face plate 2, the face plate is rotated and the burners 15 are caused to heat the glass at the narrower end of the cone until it becomes soft, the forming tool 5, which is arranged to rotate at the same speed as the face plate, is then raised slowly so that the softened glass at the narrower end of the cone is pushed upward by the thickened upper end 13 of the sleeve 10 so as to form the cylindrical stub 16 as shown in Figure 2. During this process the end of the sleeve 10 projects radially beyond the top end of the outer cylindrical portion 7 of the forming tool, and the segments are prevented from being pushed inwards due to the pressure of the glass by the tapered end of the rod 4 fitting into the tapered hole at the centre of the end wall.

The forming tool 5 is raised, with the end of inner sleeve 10 in the expanded condition, until the top surface of the flare 8 abuts against the under surface of the cone 1 surrounding the stub 16, as shown in Figure 3, and the external shaped body, which is constituted by a roller 17 having its axis set at an angle of approximately 45° is brought down on to the softened glass above the flare in the direction indicated by the arrow 19, for shaping the glass where the conical section 1 merges into the stub 16, the contact surface of the roller 17 being suitably shaped for co-operating with the shaped surface of the forming tool 5.

The glass is thus squeezed between the roller and said shaped surface for simultaneously shaping the internal and external surface of the cathode ray tube envelope in this region. The burners 15 and the roller 17 are then withdrawn and, after the glass has cooled below its softening temperature the shaft 4 is lowered, the slight taper of the outer cylindrical portion 7 of the forming tool allowing it to be freed easily from the glass wall of the stub. As the shaft 4 moves downwards its upper tapered end is withdrawn from the tapered hole at the centre of the segmented end wall 13 of the inner sleeve 10, which remains stationary within the stub until the spigot 11 contacts the lower edge of the slots 12 in the sleeve, the sleeve then being drawn downwards from the stub, the segments of the end wall 13 being pushed inwards by the pressure of the glass so facilitating its withdrawal from the stub.

The shaped glass cone is finally removed from the face plate 2 and annealed.

In Figure 5 the forming tool is shown in plan view with the end wall 13 of the inner sleeve 10 in the normal expanded condition, the broken lines 18 representing the fully contracted position of the end wall during the withdrawal of the forming tool from the stub.

The second example of a method of forming a cylindrical stub at the end of a pressed glass cone using another construction of forming tool will now be described with reference to Figures 6 to 8 of the accompanying drawing.

Figure 6:
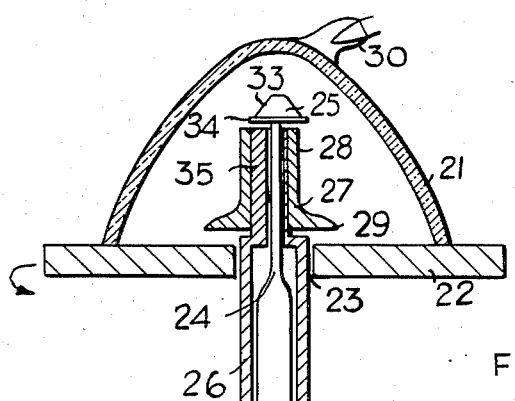

Thus referring more particularly to Figure 6, the pressed glass cone 21 which constitutes the said conical section is arranged to be carried on the top surface of a flat circular horizontal face plate 22 with its closed narrower end uppermost in a similar manner to the arrangement previously described, the face plate 22 being similarly arranged to rotate about a vertical axis with the cone 21 secured to the face plate so as to rotate with the plate about their common axis.

Located at the centre of the face plate is a circular hole 23, through which extends, coaxially with the axis of rotation, a rotatable shaft 24 carrying at its top end the forming head 25 of the forming tool, which head is arranged to push out the heat-softened glass at the narrower end of the cone for forming the cylindrical stub. This forming head 25 comprises a flat circular base portion 34, and a top portion 33 integral with it, substantially of screw-driver shape, that is to say in the shape of a truncated pyramid having a narrow rectangular base extending across a diameter of said circular base portion 34, the shaft 24 being attached to the centre of the base portion 34 on the side remote from the pyramid 33. A hollow non-rotatable shaft 26 surrounds the shaft 24 and consists of a cylindrical top portion 35, which is disposed eccentrically with respect to the shaft 24, and carries the part 27 of the forming tool which provides the shaped surface, this part 27 of the forming tool being in the form of a cylinder 28 provided with a flared out portion 29 at the lower end. The cylinder 28 has a cylindrical hole extending coaxially through the centre, through which hole the said top portion 35 of the shaft extends, the cylinder being free to rotate about said top portion of the shaft and therefore about an axis which is parallel to but offset from the axis of rotation of the face plate 22 and the pressed glass cone 21. The shafts 24 and 26 which carry the forming head 25 and cylinder 28 respectively are arranged to be raised or lowered simultaneously in a vertical direction along the axis of rotation of the face plate 22, and a plurality of gas jets 30, only one of which is shown in the figure, are situated above the face plate for softening the glass at the narrower end of the cone.

Figure 7:
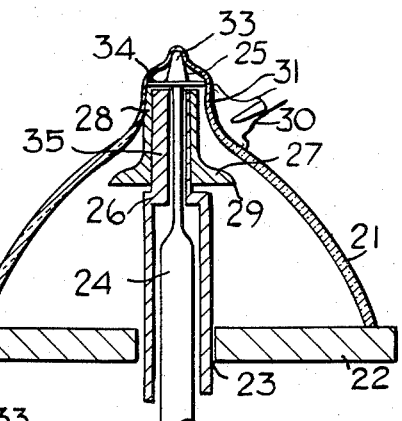

In forming the cylindrical stub after the cone 21 has been secured to the face plate 22, the face plate is rotated and the burners 30 are caused to heat the glass at the narrow end of the cone until it becomes soft; the forming head 25, which rotates at the same speed as the face plate 22, is then raised slowly together with the cylinder 28 so as to push upwards from the cone 21 the softened glass at the said narrow end as shown in Figure 7. The pyramid portion 33 of the forming head 25 keys into the softened glass so as to ensure that the closed end of the stub which is formed rotates at the same rate as the main body of the cone.

The presence of the cylindrical part 28 of the forming tool results in the formation of a substantially cylindrical side wall 31 of the stub, the burners 30 maintaining the glass in a softened condition as the stub is formed.

Figure 8:
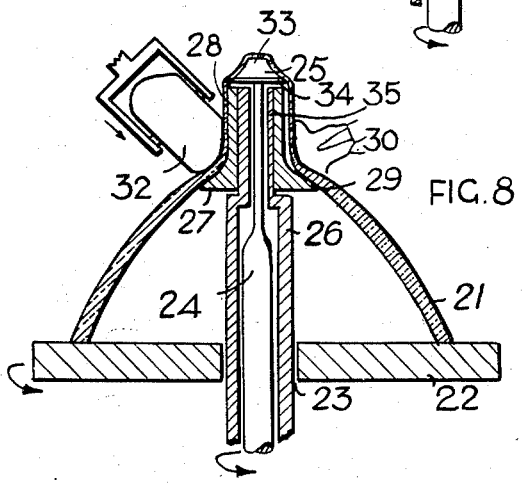

The forming head 25 and cylinder 28 are raised until the top surface of the flared portion 29 of the cylinder 28 abuts against the undersurface of the glass wall of the cone surrounding the stub as shown in Figure 8, and an external shaping roller 32 with its axis set at an angle of approximately 45°, is brought down on to the softened glass above the flared portion 29, in the direction indicated by the arrow, for shaping the glass where the conical section merges into the stub, the contact surface of the roller 32 being suitably shaped for co-operating with the shaped surface of the forming tool, the glass being shaped simultaneously internally and externally by the rollers.

The burners 30 and the external shaping roller are withdrawn and, after the glass has cooled below its softening temperature, the forming head and the cylinder 28 are withdrawn downwards from the stub, the eccentricity of the cylinder enabling this to be accomplished since the stub which is formed has an internal diameter which is greater than the diameter of the cylinder 28 and the forming head 25. The shaped glass cone is finally removed from the face plate 22 and annealed.

In these figures the part 27 of the forming tool has been shown as a solid cylinder, but it will be apparent that is could alternatively be formed as a thin-walled hollow cylinder, as in the arrangement illustrated in Figures 1 to 5.

In each of the arrangements described, for completing the formation of the required neck section, the closed end of the stub is cut off transverse to its axis and a cylindrical neck portion having a diameter and wall thickness the same as those of the stub is sealed in known manner to the part of the stub which remains.

It will be appreciated that the conical section need not necessarily be of circular cross-section; it could, for example, be of square or rectangular cross-section.

In the manufacture of a cathode ray tube envelope including a conical section and neck section manufactured in accordance with the invention, the end section is sealed to, so as to close, the wider end of the conical section. Such an envelope may be used in the manufacture of a cathode ray tube in the usual way, for example a fluorescent screen being applied to the inner surface of the end section and an electrode assembly being sealed into the neck section.

We claim:

1. The method of manufacturing from a hollow thick-walled conical glass body having a closed apex the conical section and the tubular neck section of a glass envelope for a cathode ray tube in which said neck section is in one piece with said conical section and the shape of the glass surfaces at the adjoining parts of the conical section and tubular neck section is accurately controlled, which method includes the steps of heating the said closed apex to soften the glass throughout at said apex, then pushing a shaped member including a cylindrical portion extending from a conical portion against the inner surface of the softened glass at the apex with the cylindrical portion engaging the softened glass and moving in a direction parallel to the axis of the conical body so as to draw out said softened glass into a substantially cylindrical tubular extension which is coaxial with, and has a wall thickness which is less than that of, the conical body, stopping the movement of the shaped member when the conical portion abuts the conical body, and thereafter before withdrawing the shaped member from within the cylindrical tubular extension and while the glass still is soft pressing a shaped body having a portion conforming to the cylindrical portion and a portion conforming to the conical portion against the outer side of the glass in the region where the tubular extension is joined to the conical body so as to press the softened glass against the cylindrical portion and conical portion of the shaped member and thereby shape the surfaces of the adjoining parts of the conical body and tubular extension.

2. Apparatus for manufacturing the conical section and neck section of a glass envelope for a cathode ray tube from a hollow thick-walled conical glass body having a closed apex, said apparatus comprising a rotatable support means for the conical body, heating means for heating the closed apex when the conical body is carried by the support means for softening the glass at said apex, a neck-forming tool which is cylindrical at one end and which is smoothly curved to flare outwards to provide a conical shaping surface at the other end, means for supporting the neck-forming tool within the conical body when the latter is carried by the support means with the cylindrical end of the tool directed at the apex of the conical body and for moving the neck-forming tool axially towards the apex of the conical body for causing the tool to push the softened glass outwards into the form of a tubular neck extending from the narrower end of the conical body coaxial with the axis of rotation of said rotatable support means, said supporting and moving means moving the neck-forming tool until the shaping surface of the tool just abuts against the inner surface of the conical body of the narrower end, and a shaping roller conforming to the shape of the neck-forming tool on both sides of the junction between the conical shaping surface and the cylindrical end, said shaping roller being adapted to be brought down on to the exterior surface of the glass at the junction of the conical section and neck while the rotatable support means is being rotated about the axis of the neck, so as to press the softened glass into contact with the conical shaping surface of the neck-forming tool for shaping the interior and exterior surfaces of the adjoining parts of the neck and conical section.

3. Apparatus according to claim 2 wherein the upper end of the neck-forming tool which is adapted to abut first against the glass at the closed apex of said conical body when forming the tubular neck is so constructed that it is expansible and the apparatus includes expanding means for expanding said end of the neck-forming tool during the formation of the neck so as to allow said end to contract and thereby facilitate the withdrawal of the neck-forming tool from the formed neck.

References Cited in the file of this patent

UNITED STATES PATENTS

| | | |
|---|---|---|
| 742,345 | Mygatt | Oct. 27, 1903 |
| 1,699,305 | Meyer | Jan. 15, 1929 |
| 2,102,357 | Dichter | Dec. 14, 1937 |
| 2,266,417 | Eisler | Dec. 16, 1941 |
| 2,410,345 | Hinkley | Oct. 29, 1946 |
| 2,662,346 | Giffen | Dec. 15, 1953 |